(12) United States Patent
Justice

(10) Patent No.: US 11,498,396 B1
(45) Date of Patent: Nov. 15, 2022

(54) VIEWING PORT

(71) Applicant: Robert N. Justice, Sarasota, FL (US)

(72) Inventor: Robert N. Justice, Sarasota, FL (US)

( * ) Notice: Subject to any disclaimer, the term of this patent is extended or adjusted under 35 U.S.C. 154(b) by 380 days.

(21) Appl. No.: 16/725,848

(22) Filed: Dec. 23, 2019

Related U.S. Application Data

(60) Provisional application No. 62/784,645, filed on Dec. 24, 2018.

(51) Int. Cl.
*B60J 3/02* (2006.01)
*G02B 5/00* (2006.01)

(52) U.S. Cl.
CPC ............ *B60J 3/0278* (2013.01); *G02B 5/005* (2013.01)

(58) Field of Classification Search
CPC ........ G02B 5/005; G02B 23/16; G02B 23/18; G02B 27/022; B60J 3/0278
USPC ...................... 296/97.3, 97.4, 97.5
See application file for complete search history.

(56) References Cited

U.S. PATENT DOCUMENTS

| | | | |
|---|---|---|---|
| 549,681 A | 11/1895 | Packard | |
| 1,092,110 A | 3/1914 | Klein | |
| 1,302,359 A | 4/1919 | Garbutt | |
| 1,612,184 A * | 12/1926 | Frisbey | G10K 11/22 181/22 |
| 1,678,119 A | 7/1928 | Klein | |
| 2,016,862 A * | 10/1935 | Kniesner | E06B 7/30 359/894 |
| 2,169,874 A * | 8/1939 | Hardt | E06B 7/30 359/809 |
| 2,721,759 A | 10/1955 | Tashjian | |
| 2,744,783 A | 5/1956 | Peavey | |
| 2,829,574 A | 4/1958 | Gebele | |
| 3,136,236 A | 6/1964 | Hartl | |
| 3,715,965 A | 2/1973 | Alfredsson | |
| 4,251,127 A * | 2/1981 | Yamaguchi | G02B 25/04 359/744 |
| 4,269,474 A * | 5/1981 | Kamimura | E06B 7/30 359/744 |
| 4,348,083 A * | 9/1982 | Kamimura | G02B 25/04 359/744 |
| 4,719,720 A | 1/1988 | Olsen | |
| 4,892,399 A * | 1/1990 | Ahn | G02B 17/04 359/744 |
| 5,926,663 A | 7/1999 | Suzuki | |
| 6,439,638 B1 | 8/2002 | Kawasaki et al. | |
| 6,647,857 B1 | 11/2003 | Newkirk | |
| 6,698,816 B1 | 3/2004 | Sturt et al. | |

(Continued)

FOREIGN PATENT DOCUMENTS

| | | | | |
|---|---|---|---|---|
| EP | 0104281 A1 * | 4/1984 | ............ | B60J 3/0278 |
| FR | 1378584 A * | 12/1963 | | |

(Continued)

*Primary Examiner* — D Glenn Dayoan
*Assistant Examiner* — Kevin P Weldon
(74) *Attorney, Agent, or Firm* — Frijouf, Rust & Pyle, P.A.

(57) ABSTRACT

A viewing port for sighting through a barrier includes a primary body and a secondary body engaging with a barrier aperture in the barrier. The primary body defines a first aperture. The secondary body defines a second aperture. The first aperture of the primary body is aligned with the second aperture of the secondary body defining a viewing channel between the primary body and the secondary body. The viewing channel providing a field of view through the barrier.

11 Claims, 16 Drawing Sheets

(56) References Cited

U.S. PATENT DOCUMENTS

| | | |
|---|---|---|
| 6,867,932 B2 | 3/2005 | Noguchi |
| 7,832,950 B2 | 11/2010 | Ide |
| 8,134,768 B2 | 3/2012 | Ide |
| 2004/0119313 A1 | 6/2004 | Naik |
| 2006/0033974 A1 | 2/2006 | Sato |
| 2008/0217951 A1* | 9/2008 | Aspel ............... B60J 3/0208 296/97.4 |

FOREIGN PATENT DOCUMENTS

| | | | | |
|---|---|---|---|---|
| FR | 2850700 A1 * | 8/2004 | ............... | E06B 7/30 |
| WO | WO-2017006096 A1 * | 1/2017 | ............. | F41G 1/383 |

* cited by examiner

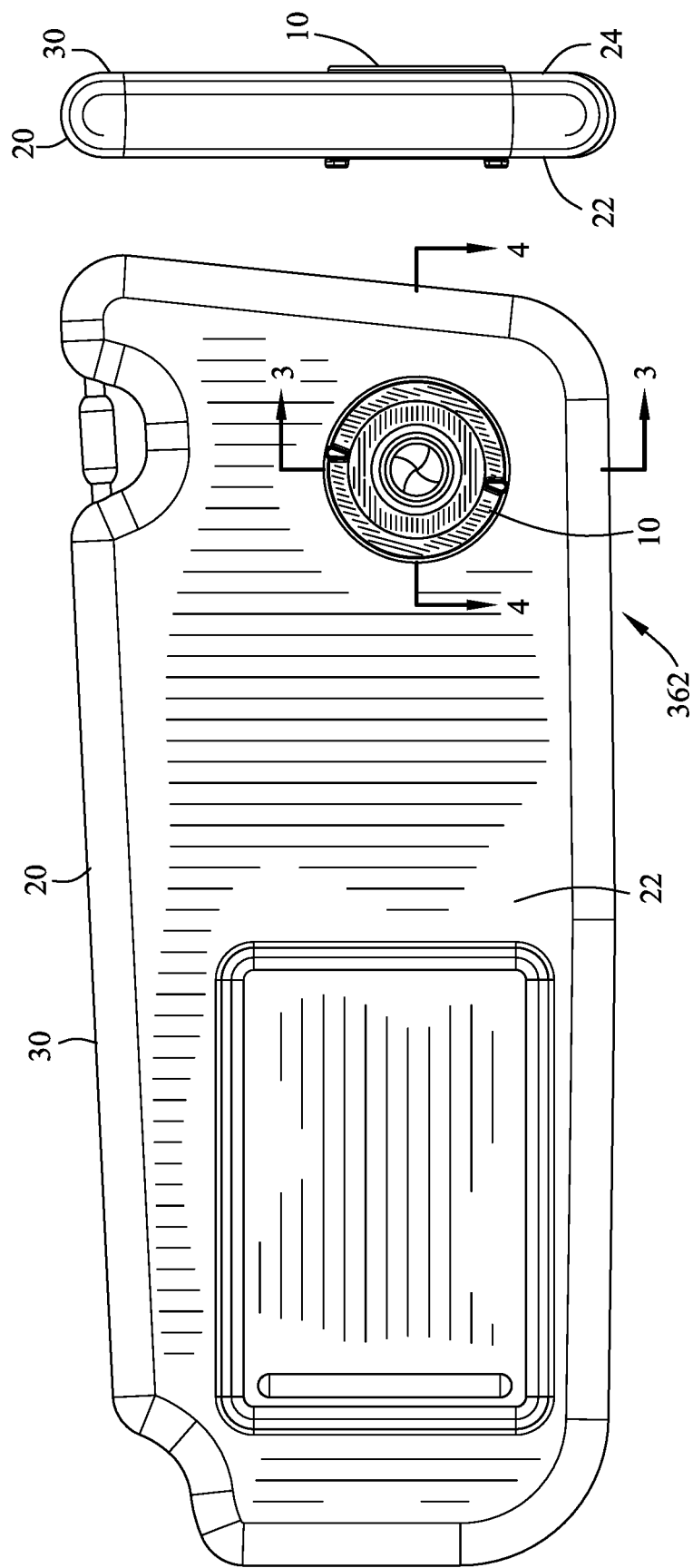

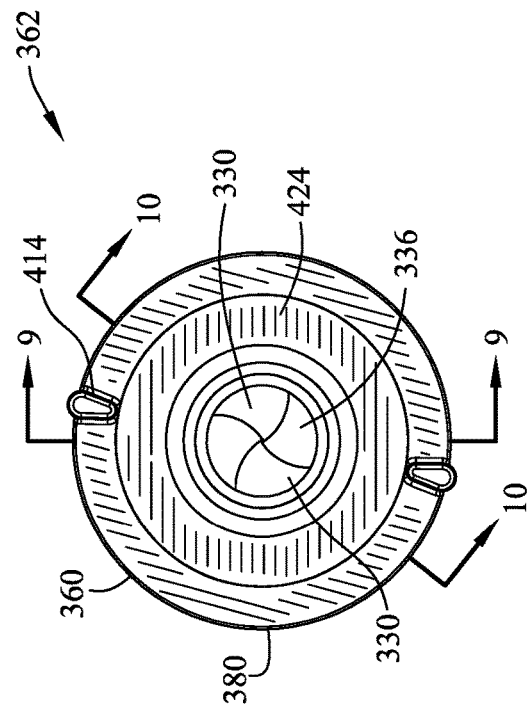
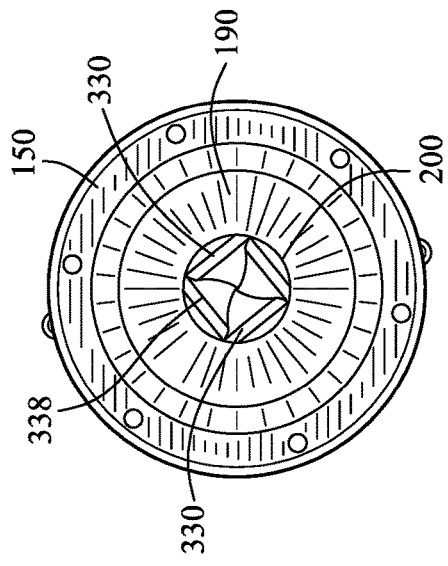
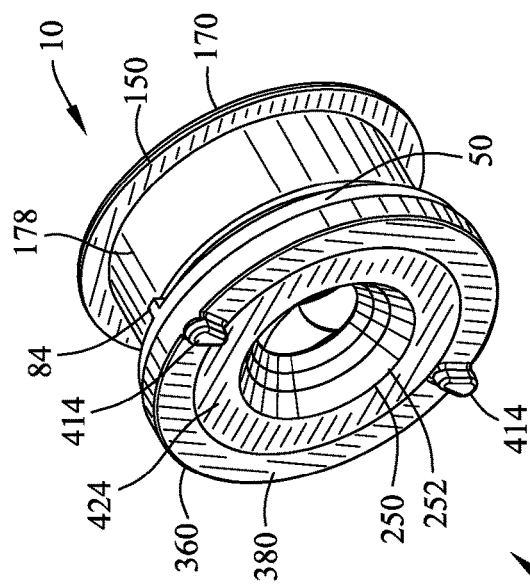
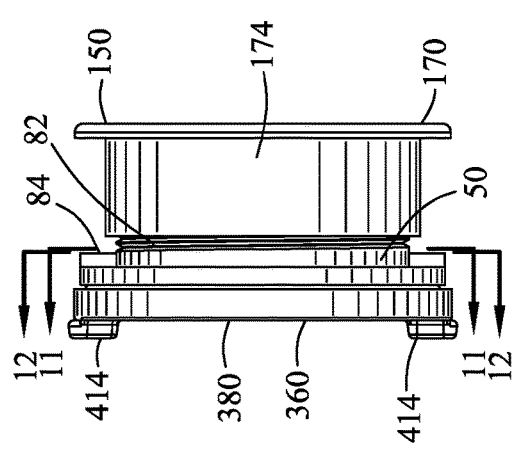

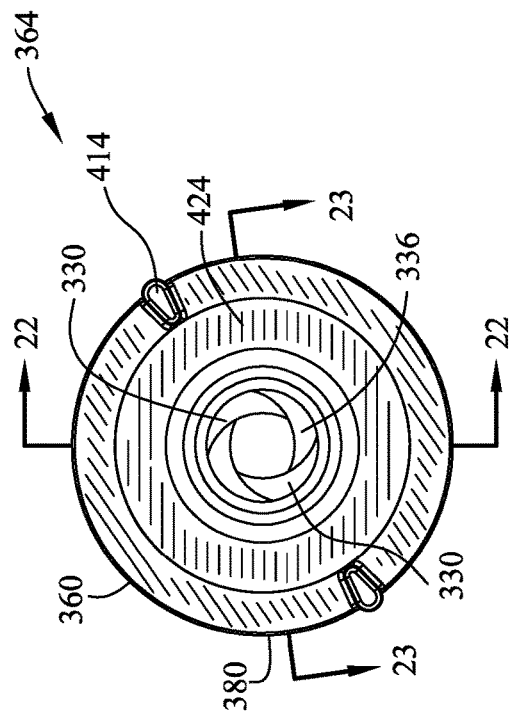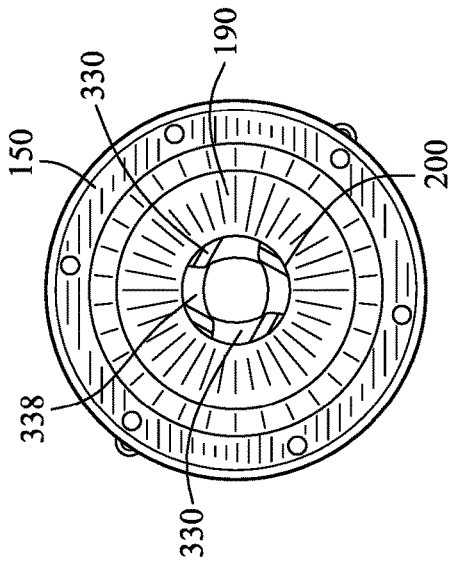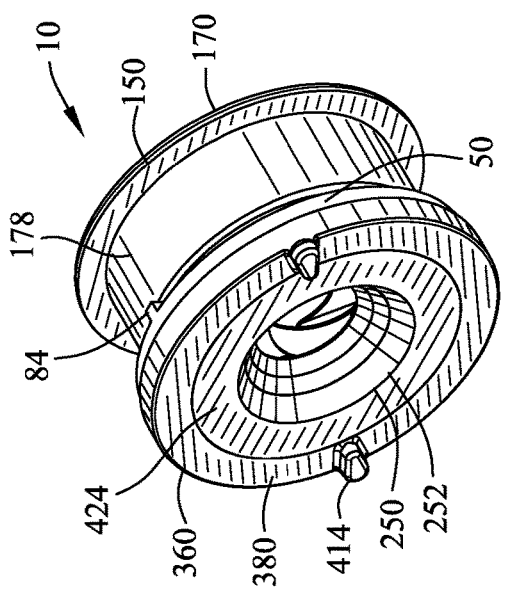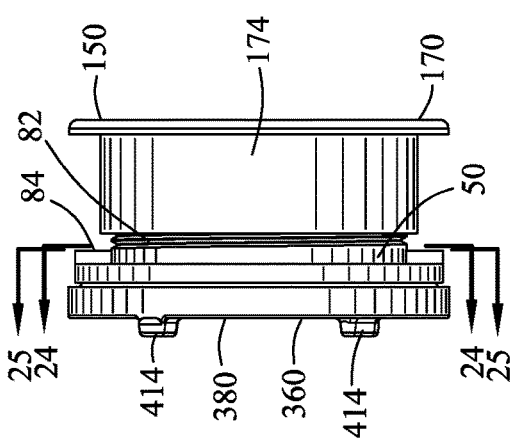

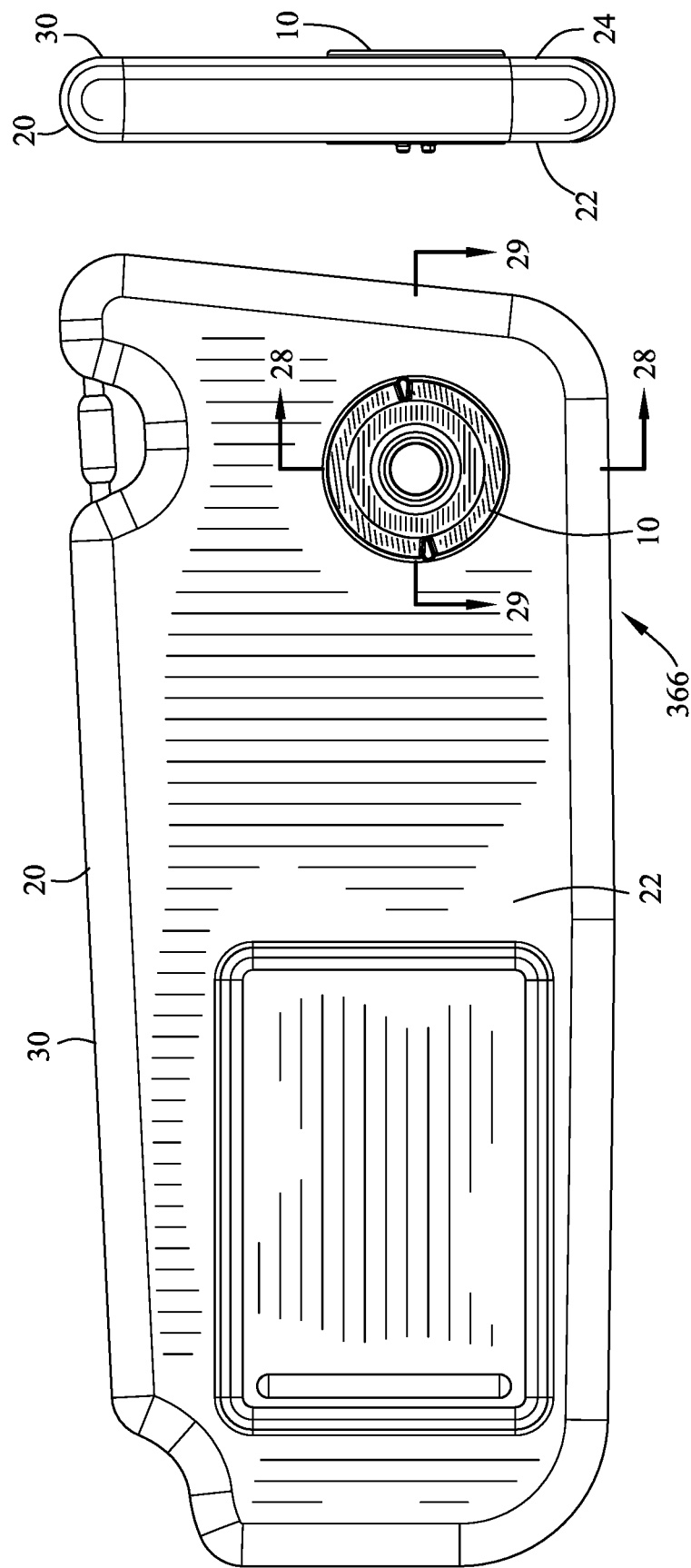

VIEWING PORT

CROSS-REFERENCE TO RELATED APPLICATIONS

This application claims benefit of U.S. Patent Provisional application No. 62/784,645 filed Dec. 24, 2018. All subject matter set forth in provisional application Ser. No. 62/784,645 is hereby incorporated by reference into the present application as if fully set forth herein.

BACKGROUND OF THE INVENTION

Field of the Invention

This invention relates to a viewing port and more particularly to a viewing port for sighting through a barrier namely a sun visor.

Background of the Invention

Barriers may serve multiple functions and purposes. For example the barrier may be utilized within a sun visor. For example barriers may serve to divide one area from another area such as the door, serve to contain or protect objects within such as a camera body or be deployed in order to shield or protect an adjacent object such as a vehicle sun visor.

The need to optically view through the barrier may be paramount to the safety of an individual viewing beyond the barrier, the operation of a device, and the gathering of conditions beyond the barrier. Furthermore, the need to increase the field of view through the barrier may serve to improve the safety of an individual viewing beyond the barrier, the operation of a device, and the gathering of conditions beyond the barrier. In addition, the ability to adjust the field of view through the barrier may also serve to improve the safety of an individual viewing beyond the barrier, the operation of a device, and the gathering of conditions beyond the barrier.

There have been many in the prior art who have attempted to solve these problems with varying degrees of success. None, however completely satisfies the requirements for a complete solution to the aforestated problem. The following U.S. Patents and Patent Applications are attempts of the prior art to solve this problem.

U.S. Pat. No. 5,498,681 to Packard discloses a photographic camera the combination of the shutter case, B; wings, C, C', pivoted on pivots, E, E, in the case and crossing each other similar to a pair of shears. A link, F, located between the shutter wings and pivotably connecting the same together at that pivots, G' and G. A pneumatic engine, D; a pin, H', extending from the piston in the engine through a slot in the case and through the whole, H, in one end of the shutter wings and all court acting together substantially as described for the purpose specified.

U.S. Pat. No. 1,092,110 to Klein discloses a camera shutter comprising a ring, an aperture partition rigidly secured within the ring so that the latter projects from one side thereof. A lens barrel is rigid with the aperture partition and projecting therefrom about the aperture to form with the ring and annular chamber. A shutter operating mechanism is arranged within the annular chamber on one side of the partition. A removable closure for the annular chamber is entirely separate from the shutter operating mechanism. A shutter mechanism is mounted on the other side of the partition and a closure for the shutter mechanism.

U.S. Pat. No. 1,302,359 to Garbutt discloses an elliptic iris diaphragm consisting of a stationary ring, a rotatable ring mounted on the stationary ring, a plurality of pairs of leaves interposed between the rings, a pin on each leaf extending into the rotatable ring to pivotably mount its associated leaf on the rotatable ring. Each of the leaves have a curved inner edge. The curvature of the inner edge of the leaves in each pair are substantially identical and different from the curvature of the inner edge of the other leaves. The rotatable ring has a series of curved slots therein, one for each leaf. The slots for each pair of like leaves are identical and such slots are eccentric to the center of the iris. A stud on each leave extends into one of the slots and means for moving the rotatable ring to vary the position of the leaves.

U.S. Pat. No. 1,678,119 to Klein discloses a photographic shutter including a casing embodying two members, one of which is in the form of an annular plate provided with a peripheral flange extended in one direction to provide a chamber for the reception of the shutter blades and provided also with a flange extended in the other direction about the opening in the annular plate to provide a lens tube. The other member of the casing is in the form of a circular plate fitting over the lens tube and having an annular peripheral flange cooperating with the first named member. Shutter blades are mounted in the chamber formed by the peripheral flange on the first named member and shutter operating mechanism is mounted between the members.

U.S. Pat. No. 2,721,759 to Tashjian discloses a glare shield for automobiles comprising in combination, a windshield having a frame there around, a bracket secured on the frame and depending there from a spindle rotatably supported on the upper end of the bracket. A flexible drive member is operatively connected to the spindle for rotating the same. A spindle is rotatably supported on the lower end of the bracket and flexible means are operatively connecting the spindles for rotating the second name spindle. A disc member is fixed on the lower spindle. The disc member has a series of spaced radially deposed elongated slots. The bracket consists of separable upper and lower portions hingedly connected. A roller is rotatably mounted on the upper portion and is adapted to receive the flexible means. The roller extends downwardly below the bottom of the upper portion thereby to lead the flexible means into frictional engagement with the upper portion of the lower portion when the latter is rotated upwardly at substantially right angles to the upper portion. Releasable means retain the lower portion in the upwardly rotated position. The last mentioned means comprises a hook secured to one of the portions adjacent the hinged mounting and a plurality of longitudinally spaced eyes are secured to the other of the portions adjacent to the hinge mounting and adapted to be selectively engaged by the book thereby to secure the lower portion in a plurality of inclinations to the vertical and to secure the lower portion in the upwardly rotated position.

U.S. Pat. No. 2,744,783 to Peavey discloses a glare screen comprising a screen. The screen consists of two facing sheets of colored transparent material. Two tabs of transparent material are interposed between the two sheets and two guards extends respectively along opposite outer sides of the transparent sheets. Each of the sheets and each of the guards have an opening therein. The openings are in longitudinal alignment. The guards and one of the sheets each have a second opening therein and the second openings being in longitudinal alignment. The screen further comprises two knobs having projecting portions thereon rotatably received in one of the guards and one of the sheets. The projecting portion of each one of the knobs being fixedly connected to one of the tabs. Each of the tabs are movable by rotation of one of the knobs into and out of alignment with a side portion of each of the second openings. The tabs are normally out of alignment with the second opening. A tape is secured around the outer perimeter of the screen so as to maintain the sheets and guards in alignment.

U.S. Pat. No. 2,829,574 to Gebele discloses a photographic shutter comprising an annular housing having an exposure aperture therethrough, a stationary front member encircling said aperture, a shutter speed adjusting member of annular form rotatably mounted on the housing and partly underlying the stationary front member and partly projecting radially outwardly beyond the stationary front member to an accessible peripheral for manual grasping and turning. A single reference point is marked on the stationary front member, a shutter speed scale is marked on the speed adjusting member in position to move past the reference point as the speed adjusting member is turned relative to the stationary from member and to be read in conjunction with the reference point. A diaphragm aperture adjusting member of annular form is rotatably mounted on the housing approximately at the rear thereof and having an arm extending forwardly past a circumferential edge of said housing. A portion of the arm is resilient, the arm near its forward end engages in depressions in the shutter speed adjusting member at a portion of the periphery thereof angularly spaced from the shutter speed scale with sufficient force to couple the aperture adjusting member frictionally to the speed adjusting member so that when either one of the adjusting members is turned the other one will normally turn with it unless forcibly restrained from turning in order to change the relative orientation of the two adjusting members with respect to each other. A light value scale is marked on the speed adjusting member on the portion thereof in proximity to the arm of the aperture adjusting member, so that the relation of the arm to the light value scale will indicate the relative orientation of the two adjusting members. A diaphragm aperture scale is marked on the stationary front member in proximity to the light value scale, the position of the arm relative to the aperture scale serves to indicate the diaphragm aperture for which the aperture adjusting member is set at any given moment.

U.S. Pat. No. 3,136,236 to Hartl discloses a photographic diagram assembly of the complete closing type, comprising a series of at least three pivoted leaves mounted for swinging movement from a position providing maximum aperture to a completely closed position, characterized by the provision of an intermediate partition member and by the fact that at least one of the leaves has both its ends lying on one side of the partition member, at least one other of the leaves has both its ends lying on the opposite side of the partition member, and at least one other of the leaves has one of its ends lying on one side of the partition member and the other of its ends lying on the opposite side of the partition member, and further characterized by the fact that when the leaves are swung to a completely closed position, the effective aperture-defining edges of all of the leaves swing substantially beyond the central axis of the aperture so that all of the leaves overlap each other at the central axis and extend across the central axis.

U.S. Pat. No. 3,715,965 to Alfredsson discloses a present diaphragm for an interchangeable lens of a single-lens mirror reflex camera in which the diaphragm is controlled by a mechanism in the camera body having a shaft detachably coupled in the edges of the lens mount which rotates in one direction during release of the camera and in the opposite direction during film transport and this rotational movement is transferred to a shaft in the lens which opens and closes the preset diaphragm by turning the diaphragm cover. Specifically, the shaft in the lens carries a cam disc which is spring-loaded and pivotally mounted on one leg of an angle lever. The other leg of the angle lever is resiliently connected with a guide plate for the diaphragm cover. In operation, the angle lever and guide plate are turned relative to one another when the guide plate movement is stopped at the preset aperture value thus allowing the cam disc to complete its rotation by the mechanism in the camera body.

U.S. Pat. No. 4,719,720 to Olsen discloses A viewing port for doors such as residences including a light polarizing assembly including at least two linear polarized optical elements, one mounted for rotation with respect to the other element(s) to change the viewing port from light passing to light blocking or reduced transmission condition. The light polarizing assembly is located at the inner side of the door and is surrounded by a tapered portion of its mounting toward the outer face to provide undistorted wide angle viewing of the area surrounding the door. In another embodiment of this invention, my viewing port is designed to be integrated into a stained glass window.

U.S. Pat. No. 5,926,663 to Suzuki discloses A rotation driving device comprises a first fixed member having an aperture, a second fixed member having an aperture, the second fixed member being fixed with respect to the first fixed member, a ring-like rotary member, the rotary member being fitted in the first fixed member at an outer diameter portion of the rotary member and being fitted in the second fixed member at a diameter portion of the rotary member having a diameter smaller than that of the outer diameter portion, and a moving member arranged to advance and retreat in a radial direction of the rotary member in accordance with a rotation of the rotary member, wherein, where an amount of fitting play between the second fixed member and the rotary member is denoted by X and an amount of fitting play between the first fixed member and the rotary member is denoted by Y, the rotation driving device satisfies the following condition: $X<Y$.

U.S. Pat. No. 6,439,638 to Kawasaki et al. discloses A sun visor to be used in a vehicle has a sun visor body with an opening; at least one punched plate having a front side and a back side and a plurality of holes opened between the front side and the back side, which is fitted in the opening of the sun visor body; and at least one light-attenuation plate for attenuating incident light horizontally passing through the holes of the punched plate, which is placed on at least one of the front and back sides of the punched plate. Therefore, the vehicle can be operated safely under the incident morning or evening sunlight.

U.S. Pat. No. 6,647,857 to Newkirk discloses a foldable bullet protective shield for mounting to the backside of a sun visor of a motor vehicle, said shield having an upper portion and a lower portion, each portion being formed of at least one plate of bullet protective material, the top edge of the lower portion being connected to the bottom edge of the upper portion via a hinge, at least one portion including a viewing window to provide a driveable view therethrough. Optionally, at least one of the portions may be encased in a shell of material such as nylon. Alternatively, the bullet protective shield can be incorporated into a shield assembly including a rotatable and swingable pivot arm connected to a mountable bracket.

U.S. Pat. No. 6,698,816 to Sturt et al. discloses a variable opacity sunscreen. The sunscreen includes sunshade body having a plurality of apertures therethrough. A blade slidable relative to the sunshade body is provided. The blade includes a plurality of apertures and a blade slot therethrough. The sunscreen further includes a lever cooperable with the blade slot to slide the blade relative to the sunshade body so that the apertures and the blade move relative to the apertures in the sunshade body to vary the opacity of a sunscreen across its entire surface or a part thereof.

U.S. Pat. No. 6,867,932 to Noguchi discloses an iris type light quantity adjusting device is disclosed that includes a plurality of shading blades, each shading blade pivoting around each shaft provided around a fixed opening in a fixed member. At least one shading blade has extended portion overlapping the other shading blade in order to keep overlapping order with the other shading blade that pivots around the shaft not adjacent to the shaft as a pivot of the above-mentioned at least one shading blade. Each of the shading blades has one or none intersection between an outer edge of the shading blade at an outside in the direction orthogonal to the optical axis and a peripheral edge of the fixed opening within an entire pivoting range, and one of a pair of shading blades approaching from substantially opposite directions during pivoting to a closing direction has, at the tip thereof, a shape not overlapping the other shading blade in a closed position.

U.S. Pat. No. 7,121,672 to Swain discloses attenuating or blocking light in a vehicle includes a rotatingly connected first and second sheet each with a plurality of holes and apertures, respectively. During use, a hole of the first sheet is registered with an aperture of the second sheet and both the hole and aperture are securely fitted about a support arm of a rear view mirror in the vehicle. Because the sheets are tinted or opaque, and fitted to eliminate space gaps, light incoming to the vehicle is attenuated or blocked. To adjust positioning, users realign a second hole of the first sheet with a second aperture of the second sheet and fit both about the support arm. Because of the arrangement of the sheets relative to one another, and their relative pivot point locations, the sheets hang in a different position on the support arm, after adjustment, higher or lower than before.

U.S. Pat. No. 7,832,950 to Ide discloses a fixed aperture and a fixed shaft are formed in a fixed member. A drive shaft is formed in a driving member. A fixed shaft hole and a drive shaft hole are formed in a plurality of diaphragm blades, and the plurality of blades is connected to the fixed shaft and the drive shaft. An aperture diameter of a variable aperture AP which is an aperture zone formed by the plurality of diaphragm blades is controlled by rotating relatively the driving member with respect to the fixed member. Here, the diaphragm blades are disposed in a plurality of layers, and a part of) the diaphragm blades belonging to an adjacent layer are disposed to be overlapping with respect to an optical axis direction.

U.S. Pat. No. 8,134,768 to Ide discloses a light adjusting apparatus for use with a small-size image pickup equipment. The light adjusting apparatus includes two substrates, out of which, one has an aperture, a spacing portion which regulates a distance between the two substrates, at least one incident-light adjusting unit which has a shaft member which becomes a center of rotation, and which is turned in a plane perpendicular to an optical axial direction, between the substrates, and at least one driving unit which drives the incident-light adjusting unit. Incident light which passes through the aperture is adjusted by turning the incident-light adjusting unit alternately, to the aperture and to a retracted position which is retracted from the aperture, by the driving unit. The light adjusting apparatus includes a notch which receives the shaft member, formed in the substrate, and a retaining portion which prevents the incident-light adjusting unit from dropping.

United States Patent Application 2004/0119313 to Naik discloses an automatic sun visor system for a vehicle includes a light detecting apparatus for detecting sunlight incident upon the face of an occupant of the vehicle. A microcontroller receives a control signal from the light detecting apparatus, and an adjustable sun visor receives a darkening control signal from the microcontroller. The darkening control signal activates the adjustable sun visor in response to the degree of sunlight detected.

United States Patent Application 2006/0033974 to Sato discloses a light regulator includes a substrate having an optical aperture, an even number of blade members (six or more) arranged substantially uniformly around the optical aperture, and spindles provided on the substrate for freely rotatably supporting base end portions of the blade members. The blade members are overlapped with each other at edges thereof, and tip portions thereof face the optical aperture. The blade members on the substrate are divided into a first blade set and a second blade set. The first blade set includes at least two first blade members overlapping with each other. The first blade members are rotatably supported at the base end portions thereof on the spindles, and tip portions of the first blades are placed inside an edge of the optical aperture when the first blades are fully closed.

Although the aforementioned prior art have contributed to the development of the art of nasal cannula tubing supports, none of these prior art patents have solved the needs of this art.

Therefore, it is an object of the present invention to provide an improved viewing port for viewing beyond the barrier.

Another object of this invention is to provide an improved viewing port for increasing the field of view through the barrier.

Another object of this invention is to provide an improved viewing port that may be adjusted to fairy the field of view through the barrier.

Another object of this invention is to provide an improved viewing port that may be utilized with a vehicle sun visor.

Another object of this invention is to provide an improved viewing port that is simple for the user to use.

Another object of this invention is to provide an improved viewing port that is easy to cost effectively produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a viewing port for sighting through a barrier. The barrier has an interior surface and an exterior surface. A barrier aperture traverses the barrier between the interior surface and the exterior surface. The barrier aperture receives the viewing port. The viewing port comprises a primary body engaging within the barrier aperture and is positioned adjacent to the interior surface of the barrier. The primary body defines an inner surface and an outer surface. A primary internal wall is within the primary body and extends between the inner surface and the outer surface. The primary internal wall defines a first aperture at the inner surface and defines a first aperture diameter. The primary internal wall defines a second aperture at the outer surface and defines a second aperture diameter. The first aperture diameter of the primary internal wall is less than the second aperture diameter of the primary internal wall for defines an internal expansion field of view channel relative to the barrier. A secondary body engages within the barrier aperture and is positioned adjacent to the exterior surface of the barrier. The secondary body defines an inner surface and an outer surface. A secondary internal wall is within the secondary body and extends between the inner surface and the outer surface. The secondary internal wall defines a first aperture at the inner surface and defines a first aperture diameter. The secondary internal wall defines a second aperture at the outer surface and defines a second aperture diameter. The first aperture diameter of the secondary internal wall is less than the second aperture diameter of the secondary internal wall for defining an external expansion field of view channel relative to the barrier. The first aperture of the primary internal wall is aligned with the first aperture of the secondary internal wall for defining a general hourglass shape channel between the internal expansion field of view channel and the external expansion field of view channel. The general hourglass shape channel increases the field of view through the barrier.

In another embodiment of the invention, the viewing port comprises a primary body engaging within the barrier aperture and positioning adjacent to the interior surface of the barrier. The primary body defines a primary aperture. A secondary body engages within the barrier aperture and is positioned adjacent to the exterior surface of the barrier. The secondary body defines a secondary aperture. The primary aperture of the primary body is aligned with the secondary aperture of the secondary body for defining a viewing channel between the primary body and the secondary body. An optical diaphragm is positioned between the primary body and the secondary body. A control arm is coupled to the optical diaphragm for displacing the optical diaphragm between an open position and a closed position and defines a variable aperture diameter. The variable aperture diameter adjusts the field of view through the barrier.

In a more specific embodiment of the invention, the control arm includes a control ring rotatably coupled to the primary body. The control ring is coupled to the optical diaphragm for rotatably displacing the optical diaphragm between the open position and the closed position and defining the variable aperture diameter.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1 is an interior view of a viewing port engaging a vehicle sun visor incorporating the present invention;

FIG. 2 is aright side view of FIG. 1;

FIG. 5 is an isometric view of the viewing port of FIG. 1;

FIG. 6 is a front view of FIG. 5;

FIG. 7 is a right side view of FIG. 5;

FIG. 8 is a rear view of FIG. 5;

FIG. 18 is an isometric view of the viewing port of FIG. 14;

FIG. 19 is a front view of FIG. 18;

FIG. 20 is a right side view of FIG. 18;

FIG. 21 is a rear view of FIG. 18;

FIG. 26 is a view similar to FIG. 14 illustrating the viewing port in a fully open position;

FIG. 27 is a right side view of FIG. 26;

Similar reference characters refer to similar parts throughout the several Figures of the drawings.

DETAILED DISCUSSION

Figure 4:
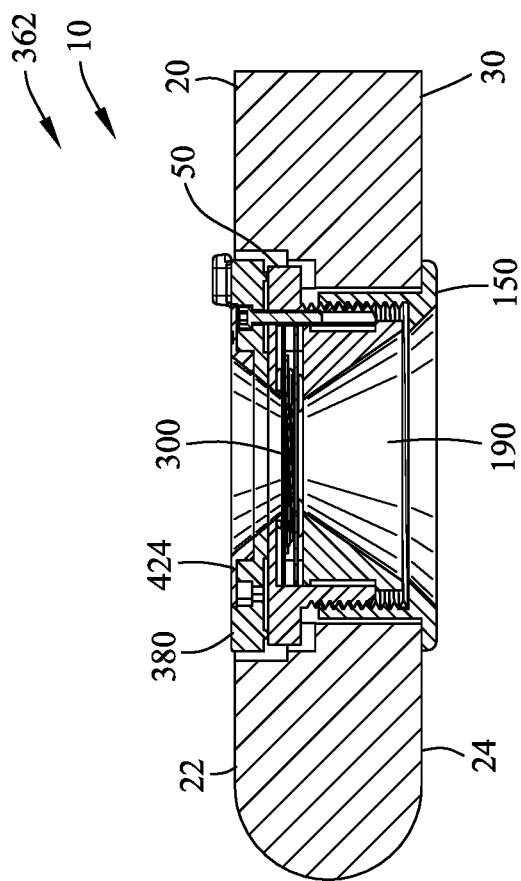
FIG. 4 is a sectional view along line 4-4 in FIG. 1 illustrating an optical diaphragm in a closed position for blocking any field of view through the viewing port.
Figure 3:
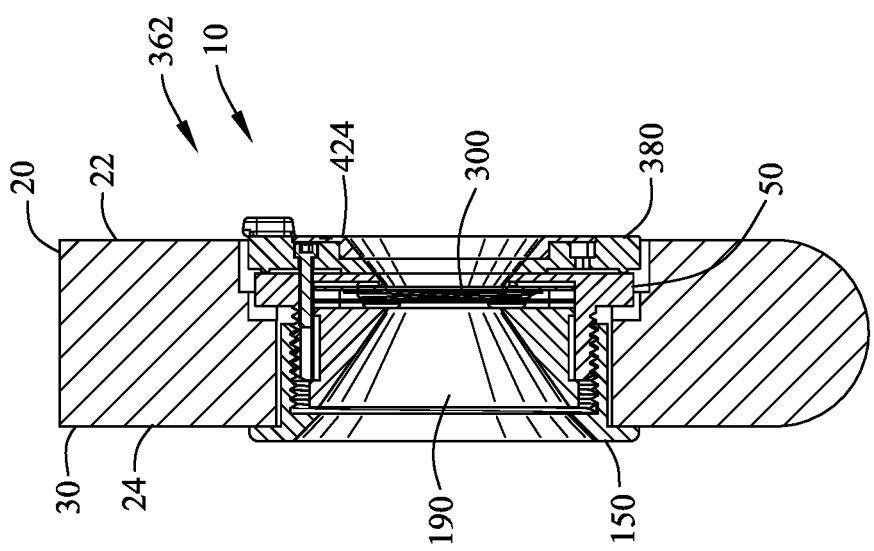
FIG. 3 is a sectional view along line 3-3 in FIG. 1 illustrating an optical diaphragm in a closed position for blocking any field of view through the viewing port.
Figure 10:
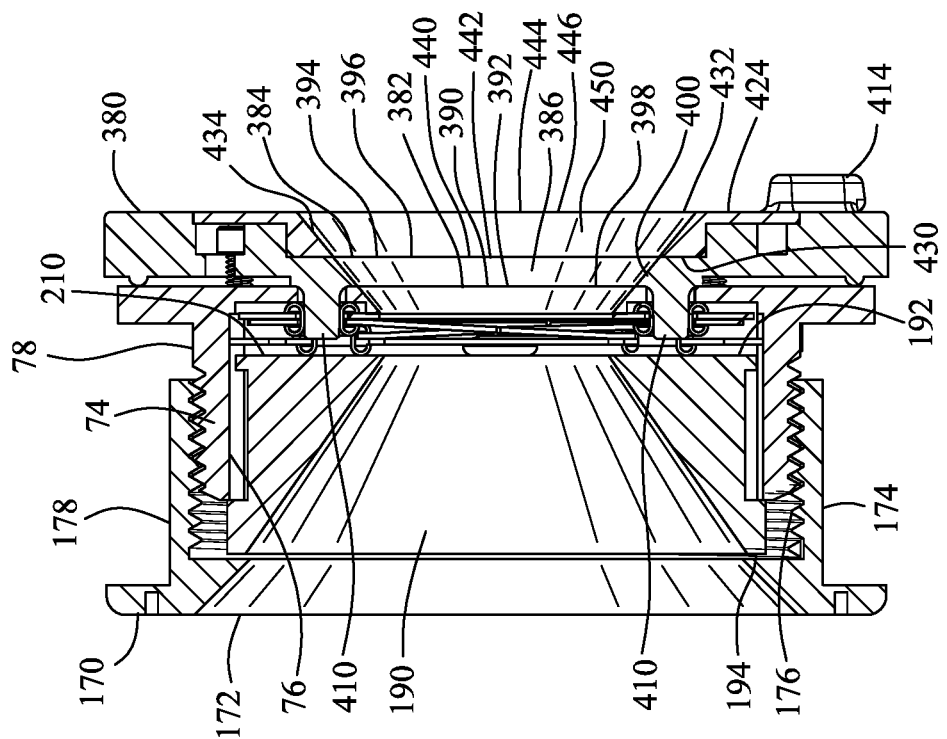
FIG. 10 is a sectional view along line 10-10 in FIG. 6.
Figure 9:
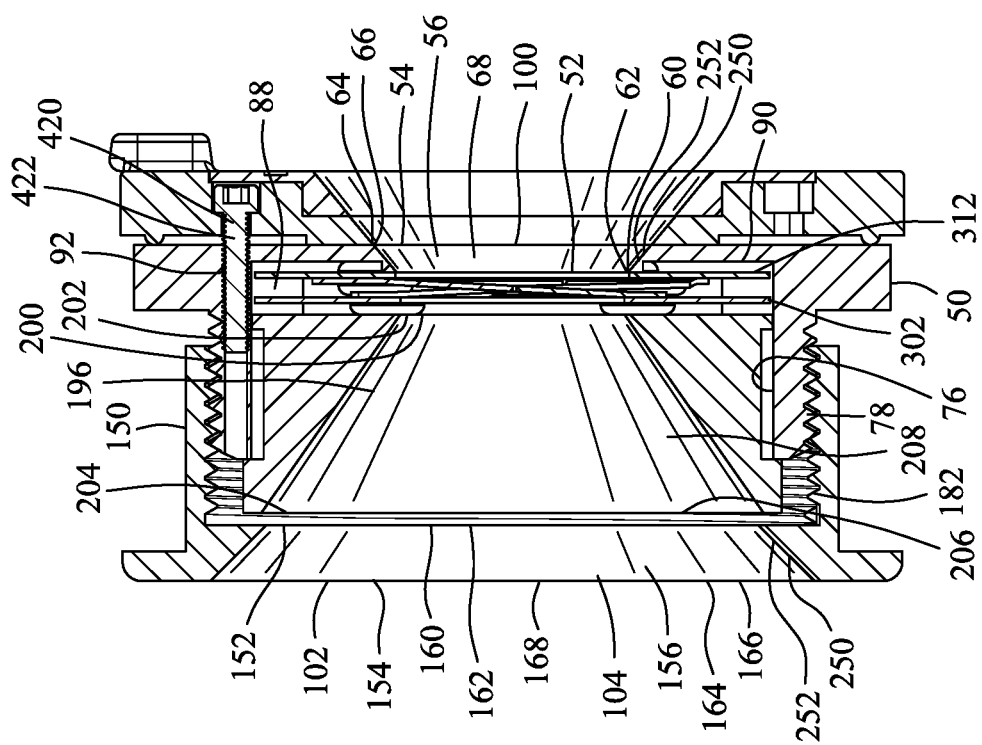
FIG. 9 is a sectional view along line 9-9 in FIG. 6.
Figure 12:
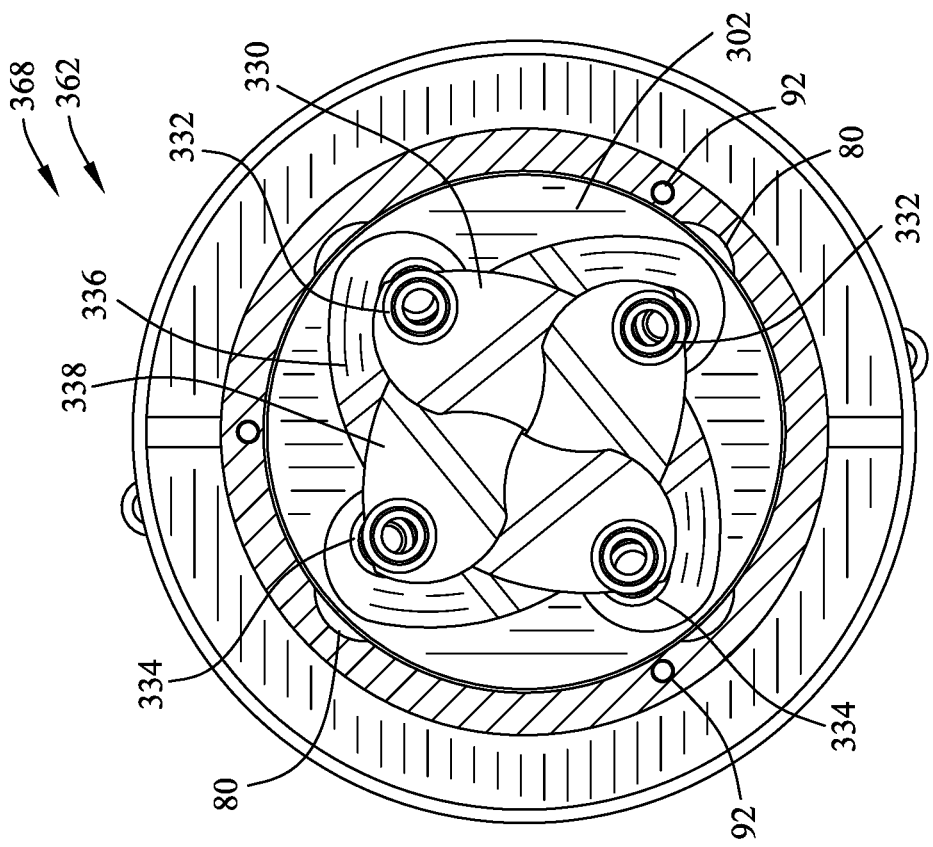
FIG. 12 is a sectional view along line 12-12 in FIG. 7.
Figure 11:
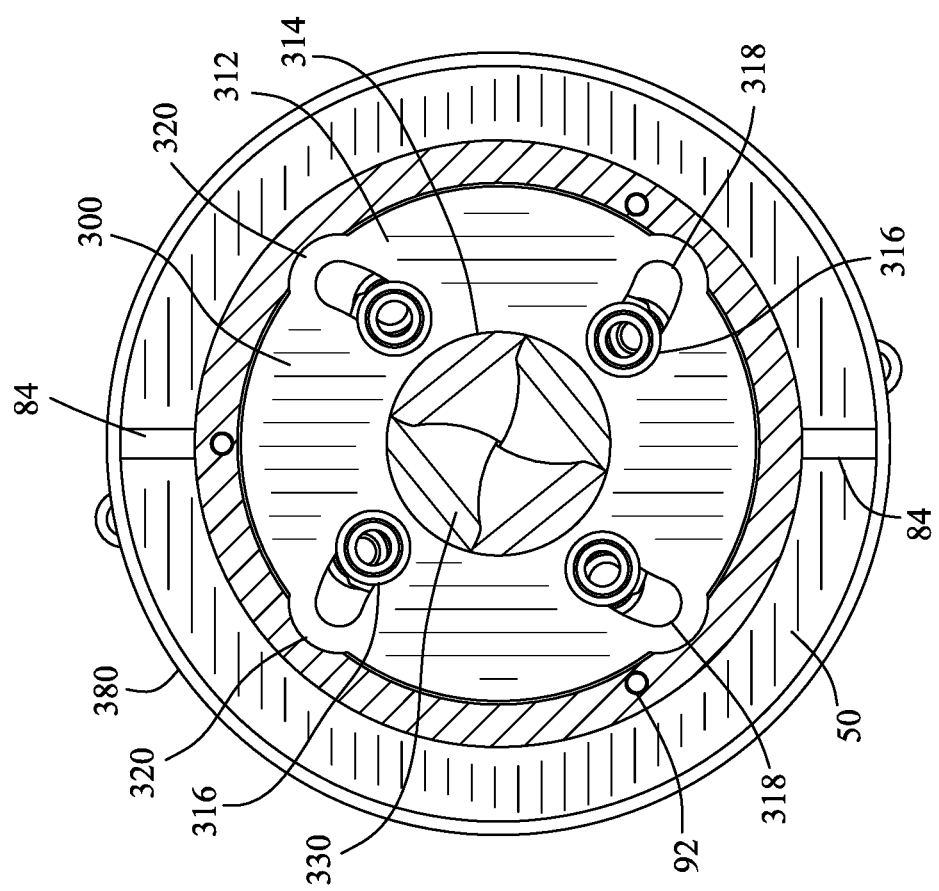
FIG. 11 is a sectional view along line 11-11 in FIG. 7.
Figure 13:
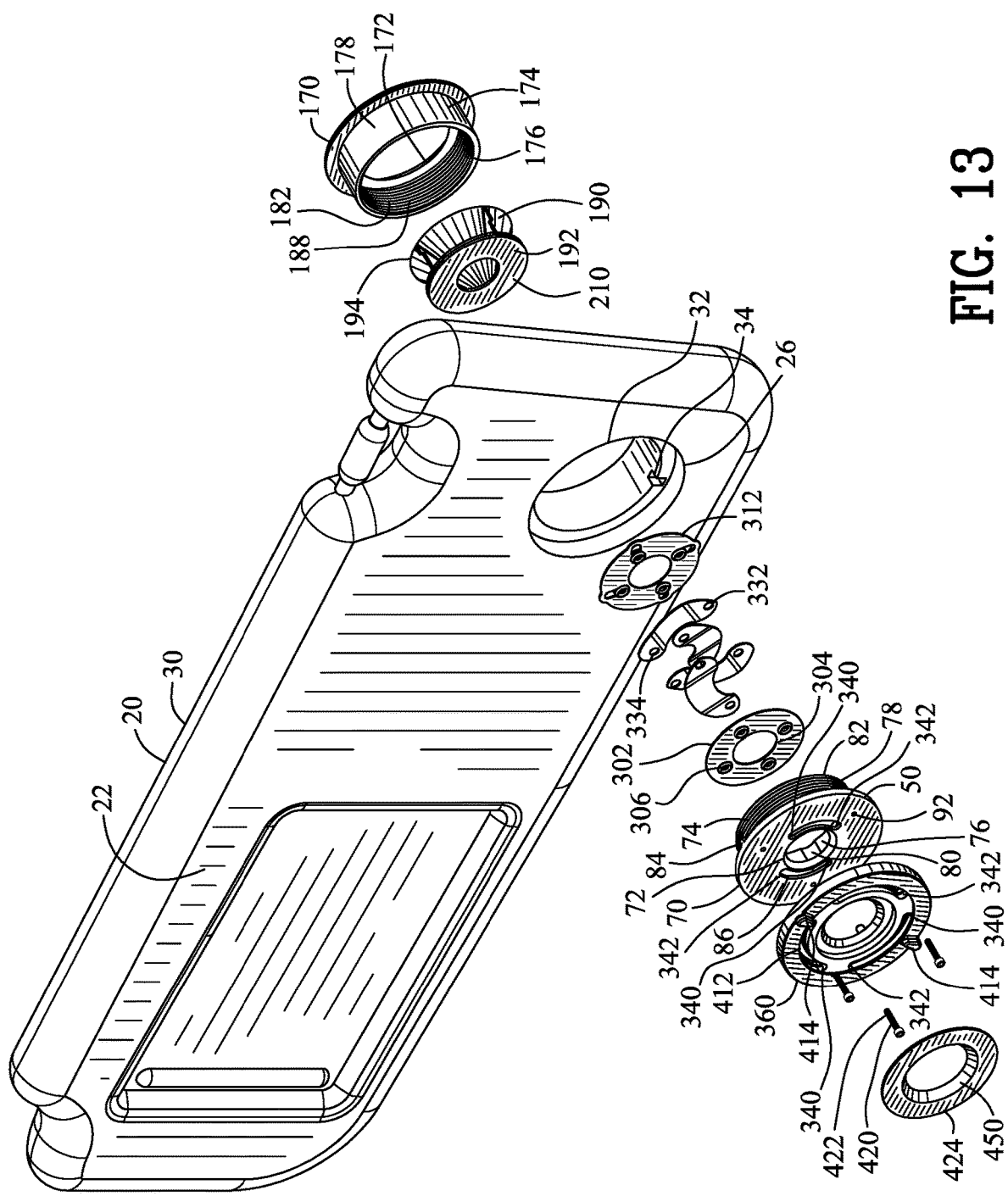
FIG. 13 is an exploded isometric view of the viewing port of FIG. 1.
Figures 14, 15:
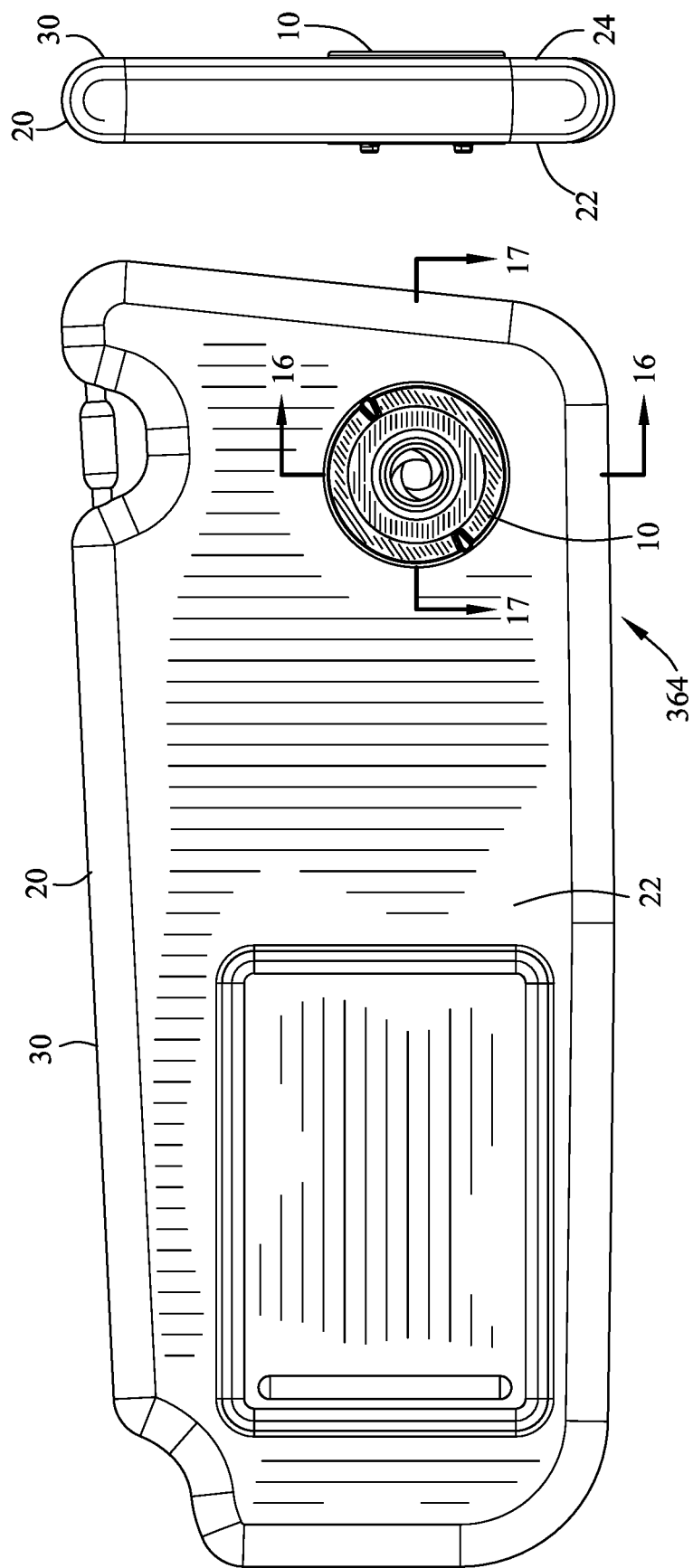
FIG. 14 is a view similar to FIG. 1 illustrating the viewing port in a partially open position.
FIG. 15 is a right side view of FIG. 14.
Figure 17:
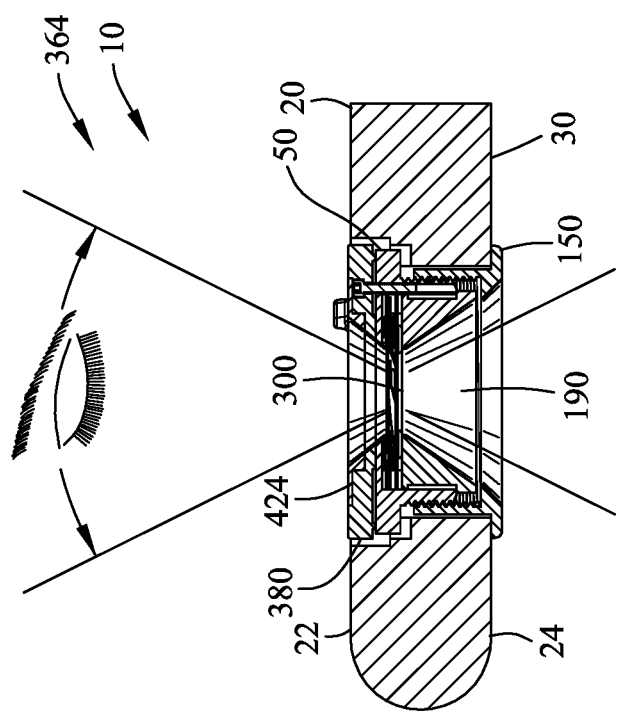
FIG. 17 is a sectional view along line 17-17 in FIG. 14 illustrating the optical diaphragm in the partially open position and allowing the partial field of view through the viewing port.
Figure 16:
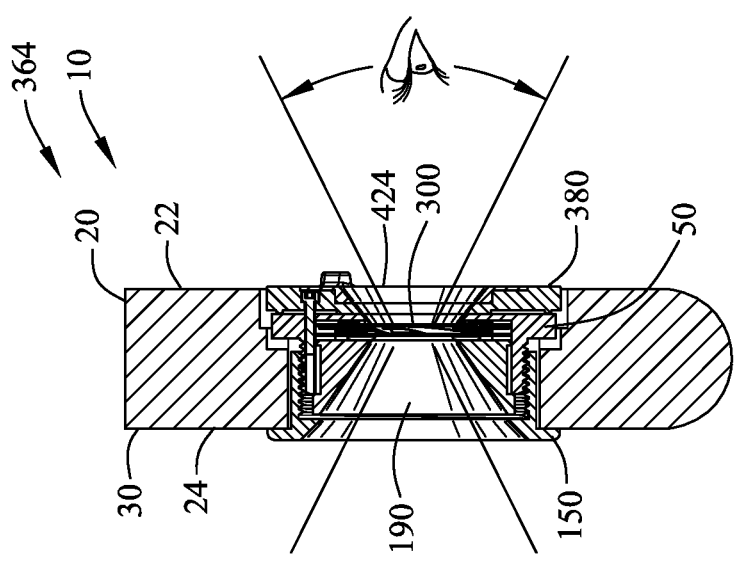
FIG. 16 is a sectional view along line 16-16 in FIG. 14 illustrating the optical diaphragm in the partially open position and allowing a partial field of view through the viewing port.
Figure 23:
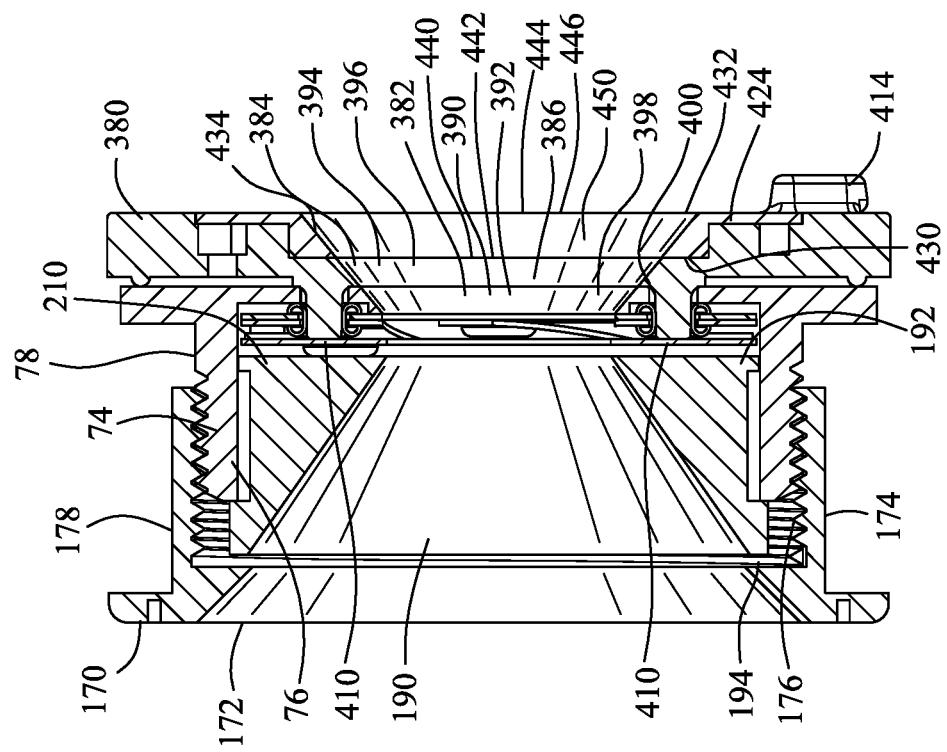
FIG. 23 is a sectional view along line 23-23 in FIG. 19.
Figure 22:
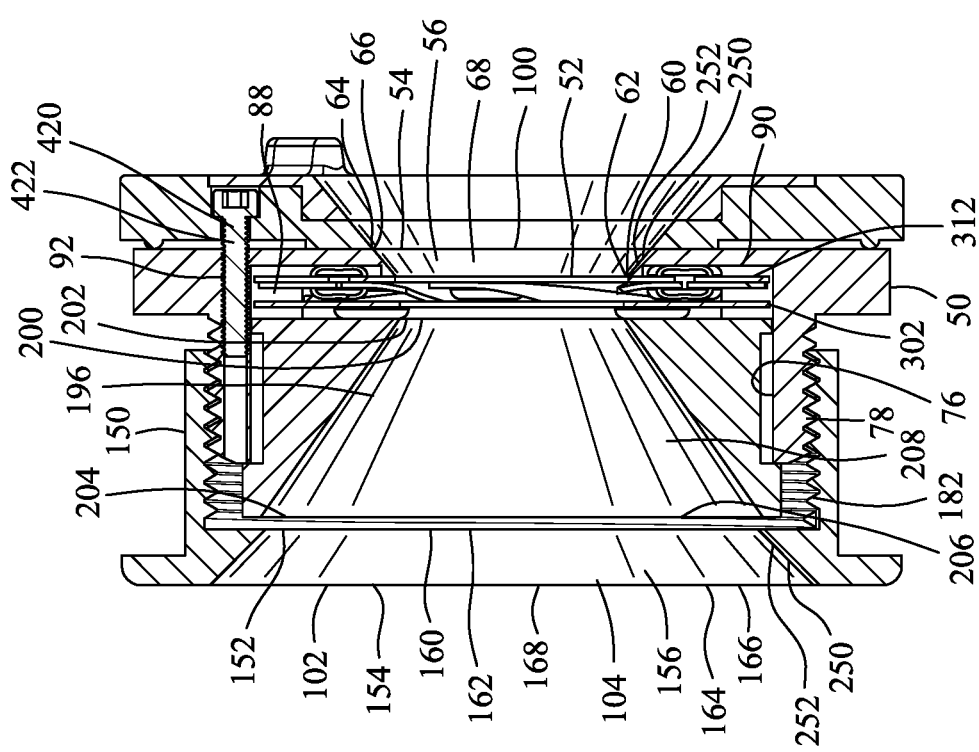
FIG. 22 is a sectional view along line 22-22 in FIG. 19.
Figure 25:
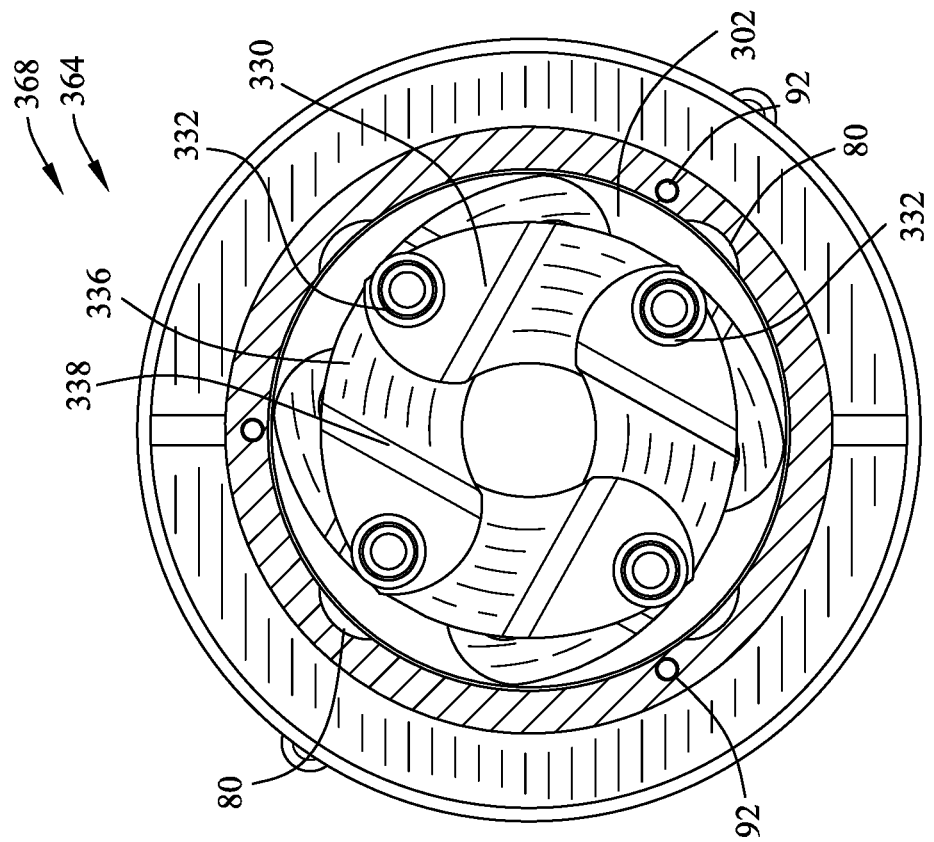
FIG. 25 is a sectional view along line 25-25 in FIG. 20.
Figure 24:
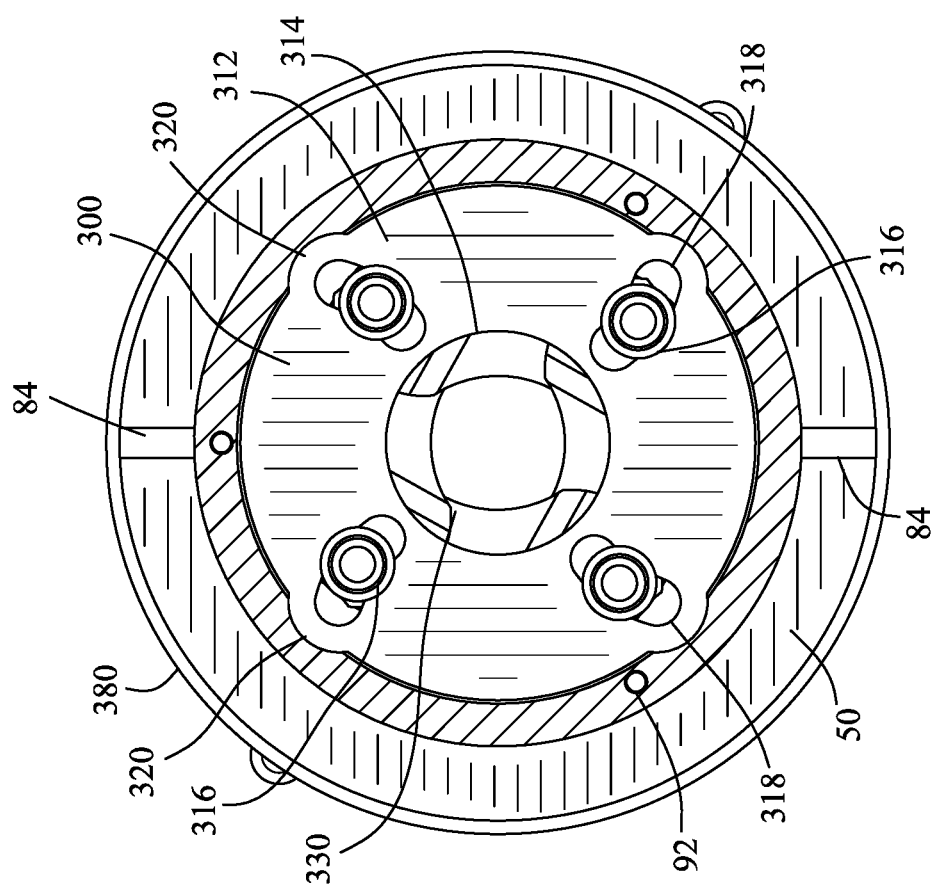
FIG. 24 is a sectional view along line 24-24 in FIG. 20.
Figure 29:
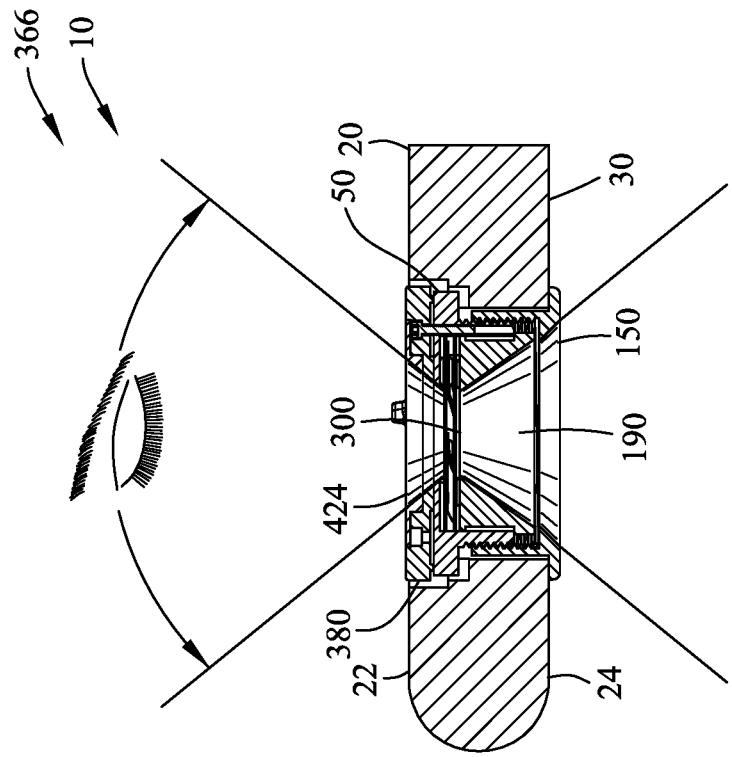
FIG. 29 is a sectional view along line 29-29 in FIG. 26 illustrating the optical diaphragm in the fully open position and allowing the fully field of view through the viewing port.
Figure 28:
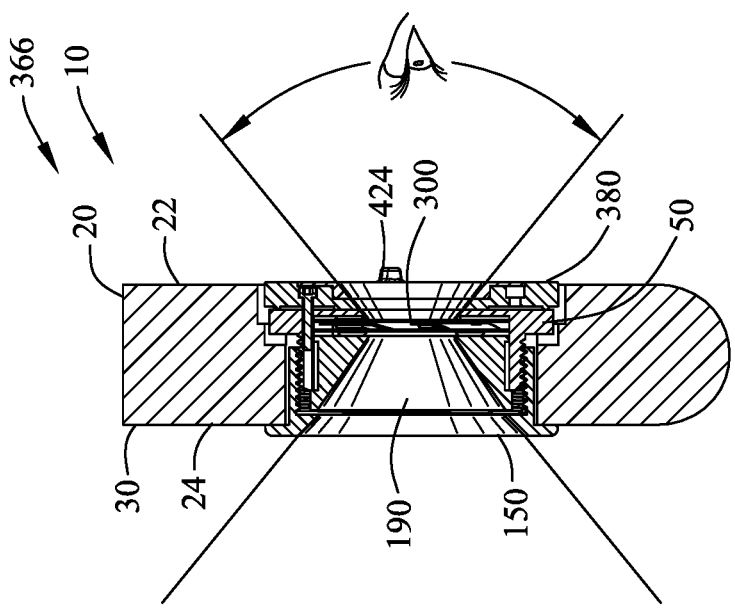
FIG. 28 is a sectional view along line 28-28 in FIG. 26 illustrating the optical diaphragm in the fully open position and allowing a fully field of view through the viewing port.
Figure 31:
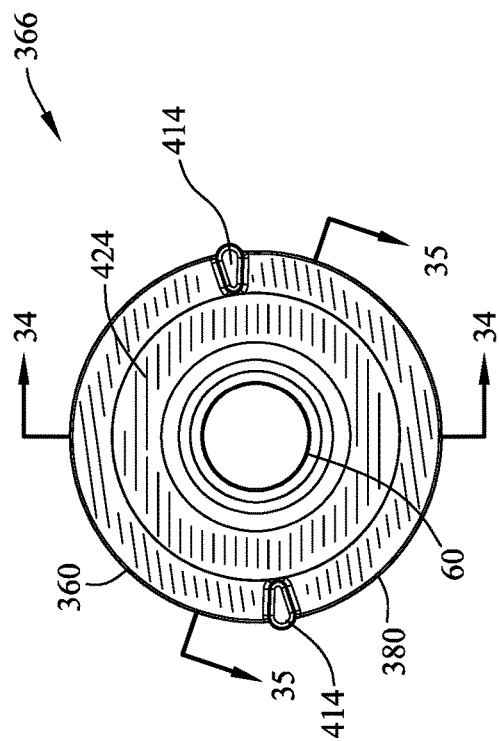
FIG. 31 is a front view of FIG. 30.
Figure 33:
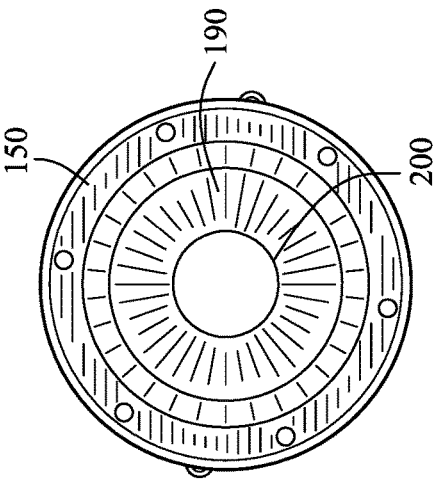
FIG. 33 is a rear view of FIG. 30.
Figure 30:
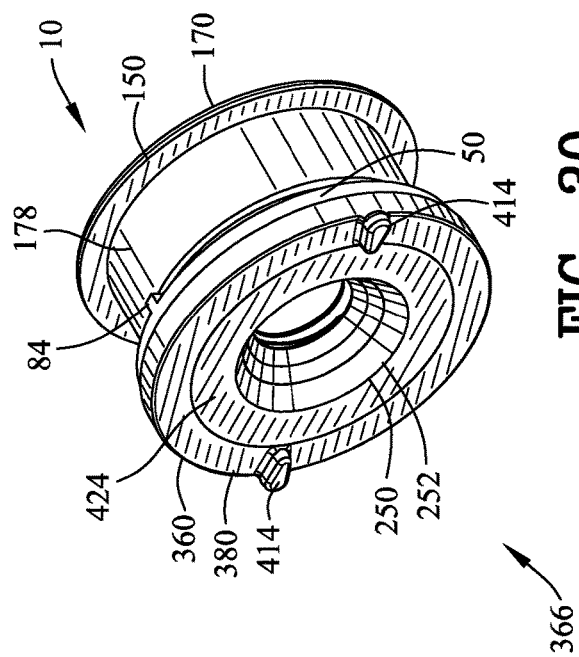
FIG. 30 is an isometric view of the viewing port of FIG. 26.
Figure 32:
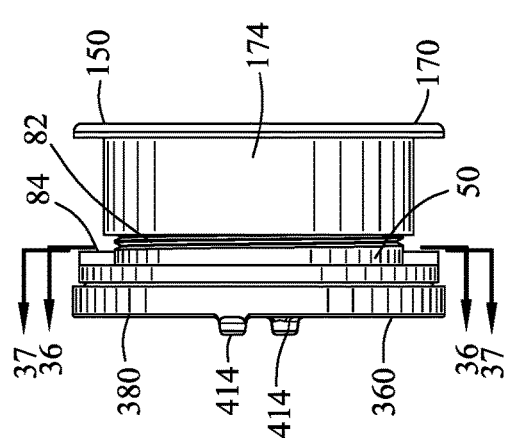
FIG. 32 is a right side view of FIG. 30.
Figures 34, 35:
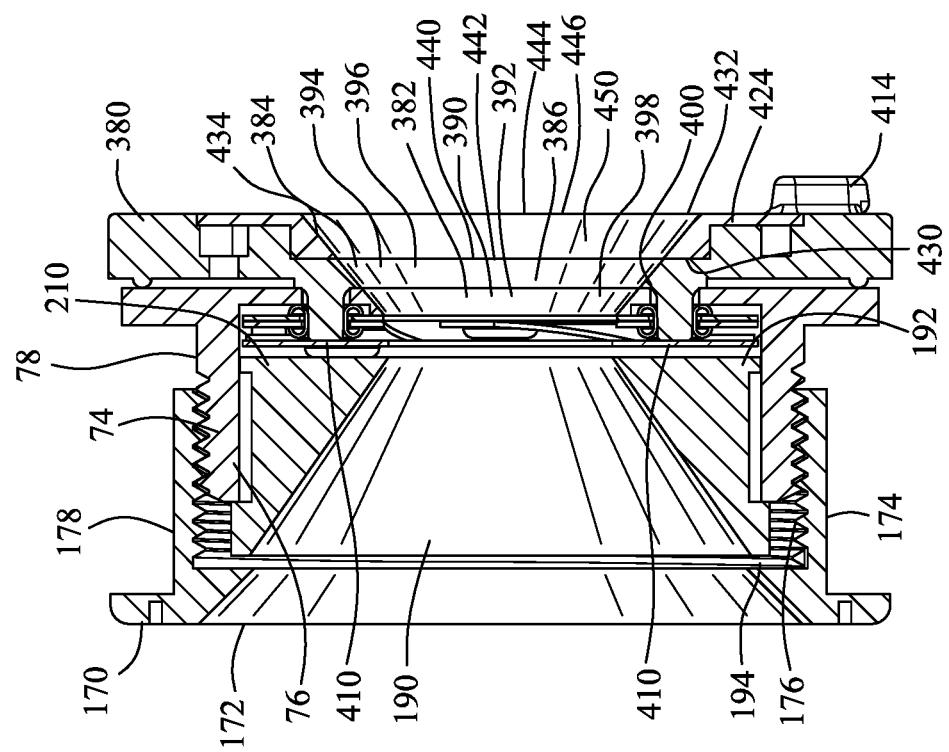
FIG. 34 is a sectional view along line 34-34 in FIG. 31.
FIG. 35 is a sectional view along line 35-35 in FIG. 31.
Figure 37:
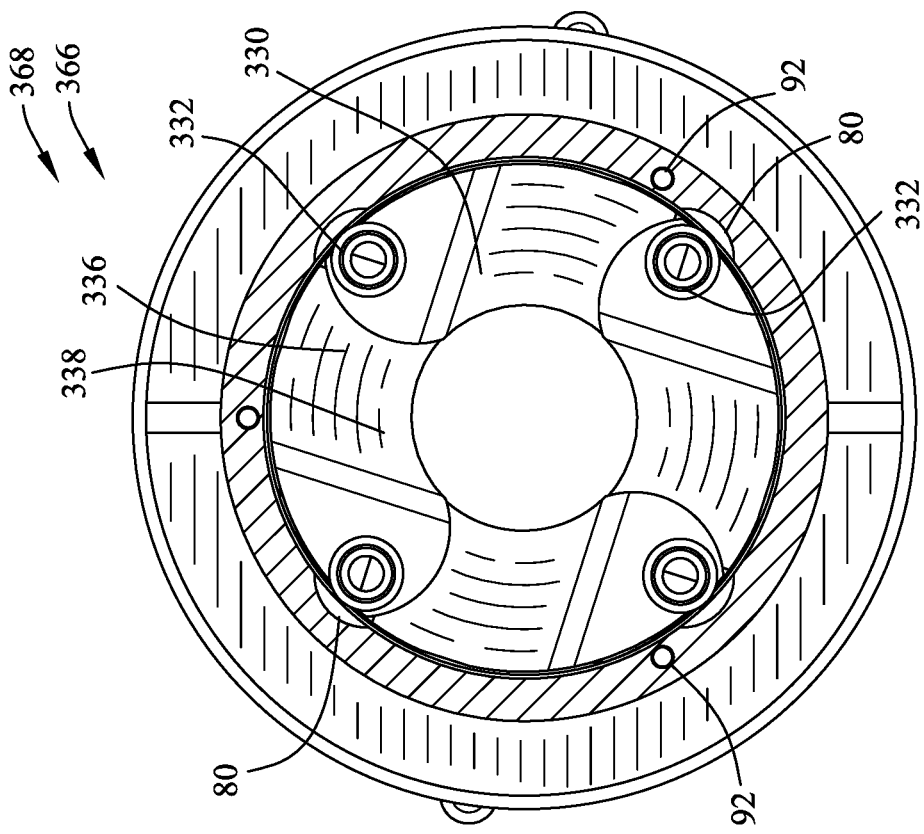
FIG. 37 is a sectional view along line 37-37 in FIG. 32.
Figure 36:
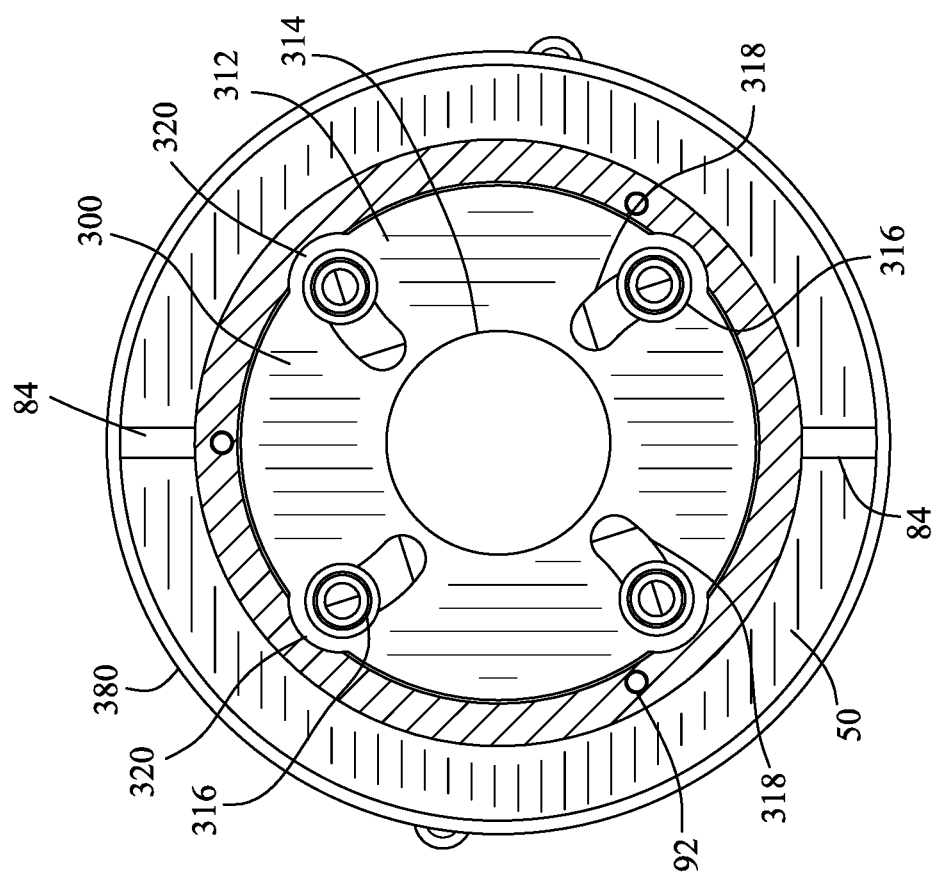
FIG. 36 is a sectional view along line 36-36 in FIG. 32.

FIGS. 1-37 illustrate a viewing port 10 for sighting through a barrier 20. The barrier 20 has an interior surface 22 and an exterior surface 24. A barrier aperture 26 traverses the barrier 20 between the interior surface 22 and the exterior surface 24. The barrier aperture 26 receives the viewing port 10. The barrier 20 may include a vehicle sun visor 30 as shown in FIGS. 1-37. Alternatively, the barrier 20 may include a door, wall, container, or other objects. FIGS. 1-37 illustrate the barrier 20 including the vehicle sun visor 30 and the barrier aperture 26 including a sun visor aperture 32. The vehicle sun visor 30 serves to minimize the threats of sun glare disturbance at signalized intersections by allowing the driver to occlude a singular object though light glare.

The viewing port 10 utilized within the vehicle sun visor 30 may be utilized for viewing through the vehicle sun visor 30 when the vehicle sun visor 30 is deployed from the general horizontal position to a general vertical position. The vision of the driver of the vehicle may be impeded by sunlight or other light sources wherein the vehicle sun visor 30 is required. Once the vehicle sun visor 30 is deployed from the general horizontal position to the general vertical position if the driver wishes to view beyond the vehicle sun visor 30, the drive must tilt his or her head for positioning their eye to the outside of the vehicle sun visor 30. The viewing port 10 permits the driver to site through the vehicle sun visor 30 while still blocking the sunlight or other light sources. More specifically, the viewing port 10 may be utilized for viewing a lighted traffic signal or sign, non-lighted traffic signal or sign or other objects outside of the vehicle.

The viewing port 10 comprises a primary body 50 engaging within the barrier aperture 26 and is positioned adjacent to the interior surface 22 of the barrier 20. The primary body 50 defines an inner surface 52 and an outer surface 54. A primary internal wall 56 is within the primary body 50 and extends between the inner surface 52 and the outer surface 54.

The primary internal wall 56 defines a first aperture 60 at the inner surface 52 and defines a first aperture diameter 62. The primary internal wall 56 defines a second aperture 64 at the outer surface 54 and defines a second aperture diameter 66. The first aperture diameter 62 of the primary internal wall 56 is less than the second aperture diameter 66 of the primary internal wall 56 for defining an internal expansion field of view channel 68 relative to the barrier 20.

The primary body 50 may further include a base plate 70 having a base plate aperture 72. A cylindrical body 74 maybe coupled to the base plate 70 that is inserted into the barrier aperture 26. The cylindrical body 74 includes a cylindrical interior wall 76 and a cylindrical exterior wall 78. The cylindrical exterior wall 78 may include external threads 82 for coupling with the secondary body 150.

A secondary body 150 engages within the barrier aperture 26 and is positioned adjacent to the exterior surface 24 of the barrier 20. The secondary body 150 defines an inner surface 152 and an outer surface 154. A secondary internal wall 156 is within the secondary body 150 and extends between the inner surface 152 and the outer surface 154. The secondary internal wall 156 defines a first aperture 160 at the inner surface 152 and defines a first aperture diameter 162. The secondary internal wall 156 defines a second aperture 164 at the outer surface 154 and defines a second aperture diameter 166. The first aperture diameter 162 of the secondary internal wall 156 is less than the second aperture diameter 166 of the secondary internal wall 156 for defining an external expansion field of view channel 168 relative to the barrier 20. More specifically, the internal expansion field of view channel 68 and the external expansion field of view channel 168 permits an increased field of view through the viewing port 10 by the driver laterally displacing his or her eye relative to the viewing port 10.

Preferably, the first aperture 60 of the primary internal wall 56 is aligned with the first aperture 160 of the secondary internal wall 156 for defining a general hourglass shape channel 250 between the internal expansion field of view channel 68 and the external expansion field of view channel 168. The general hourglass shape channel 250 increases the field of view through the barrier 20. Furthermore, the internal expansion field of view channel 68 and the external expansion field of view channel 168 may align for defining an inverted conical shaped walls 252 between the internal expansion field of view channel 68 and the external expansion field of view channel 168. The inverted conical shaped walls 252 increase the field of view through the barrier 20.

The secondary body 150 may further include a base plate 170 having a base plate aperture 172. A cylindrical body 174 maybe coupled to the base plate 170 that is inserted into the barrier aperture 26. The cylindrical body 174 includes a cylindrical interior wall 176 and a cylindrical exterior wall 178. The cylindrical interior wall 176 may include interior threads 182 for coupling with the primary body 50.

The barrier 20 or vehicle sun visor 30 may include one or more barrier grooves or visor grooves 34. The primary body 50 may include one or more base rips 84 that engage within the grooves 34. The engagement between the barrier grooves 34 and the base rips 84 prevent rotation of the viewing port 10 relative to the barrier 20. A couple 420 may extend between the primary body 50 and the secondary body 150 for coupling the primary body 50 and the secondary body 150 to the barrier 20. The couple 420 may include one or more screws 422.

Alternatively, the viewing port 10 may include an optical diaphragm 300 positioned between the primary body 50 and the secondary body 150. The primary body 50 defines a primary aperture 100. The secondary body 150 defines a secondary aperture 102. The primary aperture 100 of the primary body 50 may be aligned with the secondary aperture 102 of the secondary body 150 for defining a viewing channel 104 between the primary body 50 and the secondary body 150. The optical diaphragm 300 is positioned between the primary body 50 and the secondary body 150.

The optical diaphragm 300 may include a primary ring 302, a secondary ring 312 and a plurality of blades 330. The primary ring 302 includes a primary ring aperture 304 and a plurality of primary control eyelets 306. The secondary ring 312 includes a secondary ring aperture 314 and a plurality of secondary control eyelets 316. The plurality of secondary control eyelets 316 traverse within eyelets channels 318 within the secondary ring 312.

The plurality of blades 330 include a primary blade aperture 332 and a secondary blade aperture 334. The primary control eyelets 306 of the primary ring 302 rotatably couple with the primary blade aperture 332 of the plurality of blades 330. The secondary control eyelets 316 of the secondary ring 312 rotatably couple with the secondary blade aperture 334 of the plurality of blades 330. As the primary ring 302 is rotatably displaced relative to the viewing port 10 the plurality of blades 330 converge or diverge relative to one another for defining the variable aperture diameter 368. The eyelets channels 318 of the secondary ring 312 permit the slidable engagement of the secondary control eyelets 316 relative to the secondary ring 312 and further permit the plurality of blades 330 to converge or diverge relative to one another for defining the variable aperture diameter 368.

The plurality of blades 330 may include a transparent material 336 for permitting a non-obscured or filtered viewing through the optical diaphragm 300. Alternatively, the plurality of blades 330 may include a tinted material 3384 providing a light intensity filtering through the optical diaphragm 300.

A control arm 360 is coupled to the optical diaphragm 300 for displacing the optical diaphragm 300 between an open position 366 as shown in FIGS. 26-37 and a closed position 362 as shown in FIGS. 1-13 and defines a variable aperture diameter 368. For example, the optical diaphragm 300 may be positioned into multiple intermediate positions 364 as shown in FIGS. 14-25 for adjusting the aperture diameter within the optical diaphragm 300. The variable aperture diameter 368 adjusts the field of view through the barrier 20. More specifically, the optical diaphragm 300 permits the adjustment for blocking the sunlight or other light sources and permits the increasing or decreasing the field of view through the viewing port 10. Furthermore the optical diaphragm 300 permits the adjustment of the driver's laterally displacing his or her eye relative to the viewing port 10 for viewing through the viewing port 10.

The control arm 360 may include a control ring 380 rotatably coupled to the primary body 50. The control ring 380 is coupled to the optical diaphragm 300 for rotatably displacing the optical diaphragm 300 between the open position 366 and the closed position 362 and defining the variable aperture diameter 368.

The control ring 380 defines an inner surface 382 and an outer surface 384. A ring internal wall 386 is within the control ring 380 and extends between the inner surface 382 and the outer surface 384. The ring internal wall 386 defines a first aperture 390 at the inner surface 382 and defining a first aperture diameter 392. The ring internal wall 386 defines a second aperture 394 at the outer surface 384 and defining a second aperture diameter 396. The first aperture diameter 392 of the ring internal wall 386 is less than the second aperture diameter 396 of the ring internal wall 386 for defining a ring internal expansion field of view channel 398 relative to the barrier 20. The first aperture 390 of the ring internal wall 386 is aligned with the primary aperture 100 and the secondary aperture 102 for defining a general conical shaped internal wall 400 for increasing the field of view through the barrier 20.

More specifically, the first aperture 390 of the ring internal wall 386 is preferably aligned with the first aperture 160 of the secondary internal wall 156 for defining a general hourglass shape channel 250 between the ring internal expansion field of view channel 398 and the external expansion field of view channel 168. The general hourglass shape channel 250 increases the field of view through the barrier 20.

The primary body 50 may include a diaphragm chamber 88 for receiving the optical diaphragm 300. The secondary body 150 may include a secondary body chamber 188 for receiving the optical diaphragm 300. Furthermore, the base plate 70 of the primary body 50 includes a primary optical diaphragm containment surface 94 for abutment with the optical diaphragm 300. The cylindrical internal wall 76 of the primary body 50 may include one or more recessed channels 80. The secondary ring 312 of the optical diaphragm 300 may include secondary ring tabs 320 for engaging with the one or more recessed channels 80. The engagement between the secondary ring tabs 320 with the one or more recessed channels 80 prevents rotation of the secondary ring 312 relative to the primary body 50 upon rotation of the control ring 380.

The primary body 50 may further include one or more base arcuate channels 86. The control ring 380 may include one or more control ring pins 410. The control ring pins 410 traverse the base arcuate channels 86 and engage into the primary control eyelets 306 of the primary ring 302. As the control ring 320 is rotated, the control ring pins 410 slidably engaging within the base arcuate channels 86 and rotate the primary ring 302 relative to the primary body 50.

The control ring 380 may further include one or more control ring arcuate channels 412. The primary body 50 may include one or more threaded bores 92. The couple 420 or the one or more screws 422 traverse through the one or more control ring arcuate channels 412 and engage within the one or more threaded bores 92. As the control ring 380 is rotatably displaced relative to the primary body 50, the couple 420 slidably engages within the control ring arcuate channel 412.

The control ring 380 may include one or more control ring tabs 414 for the individual with the hand to engage a rotational force with the control ring 380. Alternatively, the control ring 380 may include a plurality of recessed notches along the border of the control ring 380.

Preferably, the base arcuate channel 86 and the control ring arcuate channel 412 include a primary channel stop end 340 and a secondary channel stop end 342 that simultaneously terminating rotation of the control ring 380 relative to the primary body 50. More specifically, the primary channel stop end 340 terminates rotation of the control ring 380 relative to the primary body 50 when the optical diaphragm 300 is in the fully open position 366. Similarly, the secondary channel stop end 342 terminates rotation of the control ring 380 relative to the primary body 50 when the optical diaphragm 300 is in the fully closed position 362. The primary channel stop end 340 and the secondary channel stop end 342 assists in preventing damage to the optical diaphragm 300 by preventing further rotation of the optical diaphragm 300 beyond its normal operational rotational displacement.

The viewing port 10 may further include a filler body 190 is positioned within the secondary body chamber 188. The body filler 190 includes an inner surface 192, an outer surface 194 and an internal wall 196. The third internal wall 196 includes a first aperture 200 defining a first aperture diameter 202 at the inner surface 192. Furthermore, the third internal wall 196 includes a second aperture 204 defining a second aperture diameter 206 at the outer surface 194. The first aperture diameter 202 is less than the second aperture diameter 206 for defining a third expansion field of view channel 208. Preferably the third expansion field of view channel 208 aligns with the external expansion field of view channel 168 for increasing the field of view through the barrier 20.

The filler body 190 may further include a secondary optical diaphragm containment surface 210. The secondary optical diaphragm containment surface 210 cooperates with the primary optical diaphragm containment surface 94 maintaining the optical diaphragm 300 within the diaphragm chamber 88. Furthermore, the secondary optical diaphragm containment surface 210 cooperates with the primary optical diaphragm containment surface 94 for maintaining the optical diaphragm 300 in a general linear orientation and prevents twisting of the optical diaphragm 300 within the diaphragm chamber 88.

The viewing port 10 may further include a control ring cover 424 for coupling with the control ring 380. Preferably, the control ring cover 424 includes an inner surface 430, an outer surface 432 and an internal wall 434. The internal wall 434 includes a first aperture 440 defining a first aperture diameter 442 at the inner surface 430. Furthermore, the internal wall 434 includes a second aperture 444 defining a second aperture diameter 446 at the outer surface 432. The first aperture diameter 442 is less than the second aperture diameter 446 for defining a fourth expansion field of view channel 450. Preferably the fourth expansion field of view channel 450 aligns with the ring internal expansion field of view channel 398 for increasing the field of view through the barrier 20.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A viewing port for sighting through a barrier, the barrier having an interior surface and an exterior surface, a barrier aperture traversing the barrier between the interior surface and the exterior surface, the barrier aperture receiving the viewing port, the viewing port, comprising:
   a primary body engaging within the barrier aperture and positioning adjacent to the interior surface of the barrier;
   said primary body defining a primary aperture;
   a secondary body engaging within the barrier aperture and positioning adjacent to the exterior surface of the barrier;
   said secondary body defining a secondary aperture;
   said primary aperture of said primary body aligning with said secondary aperture of said secondary body for defining a viewing channel between said primary body and said secondary body;
   an optical diaphragm positioned between said primary body and said secondary body;
   a control arm coupled to said optical diaphragm for displacing said optical diaphragm between an open position and a closed position and defining a variable aperture diameter;
   said variable aperture diameter adjusting the field of view through the barrier;
   said control arm includes a control ring rotatably coupled to said primary body; and
   said control ring coupled to said optical diaphragm for rotatably displacing said optical diaphragm between said open position and said closed position and defining said variable aperture diameter.

2. The viewing port for sighting through the barrier as set forth in claim 1, wherein said control ring defines an inner surface and an outer surface;
   a ring internal wall within said control ring and extending between said inner surface and said outer surface;
   said ring internal wall defining a first aperture at said inner surface and defining a first aperture diameter;
   said ring internal wall defining a second aperture at said outer surface and defining a second aperture diameter;
   said first aperture diameter of said ring internal wall being less than said second aperture diameter of said ring internal wall for defining a ring internal expansion field of view channel relative to the barrier; and
   said first aperture of said ring internal wall aligning with said primary aperture and said secondary aperture for defining a general conical shaped internal wall for increasing the field of view through the barrier.

3. The viewing port for sighting through the barrier as set forth in claim 2, wherein said secondary body defining an inner surface and an outer surface;
   a secondary internal wall within said secondary body and extending between said inner surface and said outer surface;
   said secondary internal wall defining a first aperture at said inner surface and defining a first aperture diameter;
   said secondary internal wall defining a second aperture at said outer surface and defining a second aperture diameter;
   said first aperture diameter of said secondary internal wall being less than said second aperture diameter of said secondary internal wall for defining an external expansion field of view channel relative to the barrier;
   said first aperture of said ring internal wall aligning with said first aperture of said secondary internal wall for defining a general hourglass shape channel between said ring internal expansion field of view channel and said external expansion field of view channel; and
   said general hourglass shape channel increasing the field of view through the barrier.

4. The viewing port for sighting through the barrier as set forth in claim 3, wherein said primary body defining an inner surface and an outer surface;
   a primary internal wall within said primary body and extending between said inner surface and said outer surface;
   said primary internal wall defining a first aperture at said inner surface and defining a first aperture diameter;
   said primary internal wall defining a second aperture at said outer surface and defining a second aperture diameter;
   said first aperture diameter of said primary internal wall being less than said second aperture diameter of said primary internal wall for defining an internal expansion field of view channel relative to the barrier;
   said first aperture of said ring internal wall aligning with said first aperture of said primary internal wall for defining said general hourglass shape channel between said ring internal expansion field of view channel and said internal expansion field of view channel; and
   said general hourglass shape channel increasing the field of view through the barrier.

5. The viewing port for sighting through the barrier as set forth in claim 1, further including a couple extending between said primary body and said secondary body for coupling said primary body and said secondary body to the barrier.

6. A viewing port for sighting through a vehicle sun visor, the vehicle sun visor having an interior surface and an exterior surface, a sun visor aperture traversing the vehicle sun visor between the interior surface and the exterior surface, the sun visor aperture receiving the viewing port, the viewing port, comprising:

a primary body engaging within the sun visor aperture and positioning adjacent to the interior surface of the vehicle sun visor;

said primary body defining an inner surface and an outer surface;

a primary internal wall within said primary body and extending between said inner surface and said outer surface;

said primary internal wall defining a first aperture at said inner surface and defining a first aperture diameter;

said primary internal wall defining a second aperture at said outer surface and defining a second aperture diameter;

said first aperture diameter of said primary internal wall being less than said second aperture diameter of said primary internal wall for defining an internal expansion field of view channel relative to the vehicle sun visor;

a secondary body engaging within the sun visor aperture and positioning adjacent to the exterior surface of the vehicle sun visor;

said secondary body defining an inner surface and an outer surface;

a secondary internal wall within said secondary body and extending between said inner surface and said outer surface;

said secondary internal wall defining a first aperture at said inner surface and defining a first aperture diameter;

said secondary internal wall defining a second aperture at said outer surface and defining a second aperture diameter;

said first aperture diameter of said secondary internal wall being less than said second aperture diameter of said secondary internal wall for defining an external expansion field of view channel relative to the vehicle sun visor;

said internal expansion field of view channel and said external expansion field of view channel increasing the field of view through the vehicle sun visor;

an optical diaphragm positioned between said primary body and said secondary body;

a control arm coupled to said optical diaphragm for displacing said optical diaphragm between an open position and a closed position and defining a variable aperture diameter; and said variable aperture diameter adjusting the field of view through the vehicle sun visor.

7. The viewing port for sighting through the vehicle sun visor as set forth in claim 6, wherein said first aperture of said primary internal wall aligning with said first aperture of said secondary internal wall for defining a general hourglass shape channel between said internal expansion field of view channel and said external expansion field of view channel; and said general hourglass shape channel increasing the field of view through the vehicle sun visor.

8. The viewing port for sighting through the vehicle sun visor as set forth in claim 6, wherein said internal expansion field of view channel and said external expansion field of view channel align for defining an inverted conical shaped walls between said internal expansion field of view channel and said external expansion field of view channel; and said inverted conical shaped walls increasing the field of view through the vehicle sun visor.

9. The viewing port for sighting through the vehicle sun visor as set forth in claim 6, further including a couple extending between said primary body and said secondary body for coupling said primary body and said secondary body to the vehicle sun visor.

10. A viewing port for sighting through a vehicle sun visor, the vehicle sun visor having an interior surface and an exterior surface, a sun visor aperture traversing the vehicle sun visor between the interior surface and the exterior surface, the sun visor aperture receiving the viewing port, the viewing port, comprising:

a primary body engaging within the sun visor aperture and positioning adjacent to the interior surface of the vehicle sun visor;

said primary body defining a primary aperture;

a secondary body engaging within the sun visor aperture and positioning adjacent to the exterior surface of the vehicle sun visor;

said secondary body defining a secondary aperture;

said primary aperture of said primary body aligning with said secondary aperture of said secondary body for defining a viewing channel between said primary body and said secondary body;

an optical diaphragm positioned between said primary body and said secondary body;

a control arm coupled to said optical diaphragm for displacing said optical diaphragm between an open position and a closed position and defining a variable aperture diameter;

said variable aperture diameter adjusting the field of view through the vehicle sun visor;

said control arm includes a control ring rotatably coupled to said primary body; and said control ring coupled to said optical diaphragm for rotatably displacing said optical diaphragm between said open position and said closed position and defining said variable aperture diameter.

11. The viewing port for sighting through the vehicle sun visor as set forth in claim 10, further including a couple extending between said primary body and said secondary body for coupling said primary body and said secondary body to the vehicle sun visor.

* * * * *